(12) United States Patent
Tsai

(10) Patent No.: US 6,332,565 B1
(45) Date of Patent: Dec. 25, 2001

(54) STRUCTURE FOR CARRYING SCOOTER

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/631,283

(22) Filed: Aug. 3, 2000

(30) Foreign Application Priority Data

Mar. 22, 2000 (TW) ................................................ 89204823

(51) Int. Cl.$^7$ ....................................................... A45F 3/14
(52) U.S. Cl. ........................ 224/257; 224/600; 280/288.4
(58) Field of Search ..................................... 224/150, 257, 224/258, 600; 280/288.4

(56) References Cited

U.S. PATENT DOCUMENTS

| | | | |
|---|---|---|---|
| 4,750,578 | * | 6/1988 | Brandenfels . |
| 4,828,284 | * | 5/1989 | Sandgren . |
| 4,911,347 | * | 3/1990 | Wilhite ................................. 224/257 |
| 5,167,597 | * | 12/1992 | David . |
| 5,680,939 | * | 10/1997 | Oliver .............................. 224/150 X |
| 5,695,101 | * | 12/1997 | Frietze ............................. 224/257 X |
| 5,820,146 | * | 10/1998 | Van Ligten . |
| 5,971,239 | * | 10/1999 | Marable ................................ 224/150 |
| 6,161,860 | * | 12/2000 | Corneau . |
| 6,193,012 | * | 2/2001 | Olivas ............................. 224/257 X |

FOREIGN PATENT DOCUMENTS

2028624 A * 3/1980 (GB) .

* cited by examiner

*Primary Examiner*—Gregory M. Vidovich
(74) *Attorney, Agent, or Firm*—Browdy and Neimark

(57) ABSTRACT

A scooter carrying structure comprises a shoulder strap and two retaining rings which are fastened with the upper end and the lower end of the collapsible upright handlebar of the scooter. The shoulder strap is provided at both ends with a retaining hook and is retained by the upright handlebar such that the retaining hooks of the shoulder strap are engaged with the two retaining rings of the upright handlebar. As the upright handlebar is collapsed, the shoulder strap is worn over the shoulder of a person for carrying the scooter.

2 Claims, 7 Drawing Sheets

STRUCTURE FOR CARRYING SCOOTER

FIELD OF THE INVENTION

The present invention relates generally to a scooter, and more. particularly to a structure for carrying the scooter on the shoulder of a person.

BACKGROUND OF THE INVENTION

The scooter is a popular amusement device among the youngster. In light of the scooter being allowed to ride on in the restricted areas, the scooter must be carried with hand to the restricted areas. In general, the scooter is not provided with a means to facilitate the carrying of the scooter.

SUMMARY OF THE INVENTION

The primary objective of the present invention is to provide a scooter carrier to facilitate the carrying of the scooter on the shoulder of a person.

In keeping with the principle of the present invention, the foregoing objective of the present invention is attained by a scooter carrying structure comprising a shoulder strap having at both ends thereof a hook, and two retaining rings fastened respectively with the top end and the bottom end of the steering handlebar of a scooter. The shoulder strap does not hinder the riding of the scooter by a youngster. As the steering handlebar is collapsed, the shoulder strap is worn over the shoulder for carrying the scooter.

DETAILED DESCRIPTION OF THE INVENTION

Figure 1:
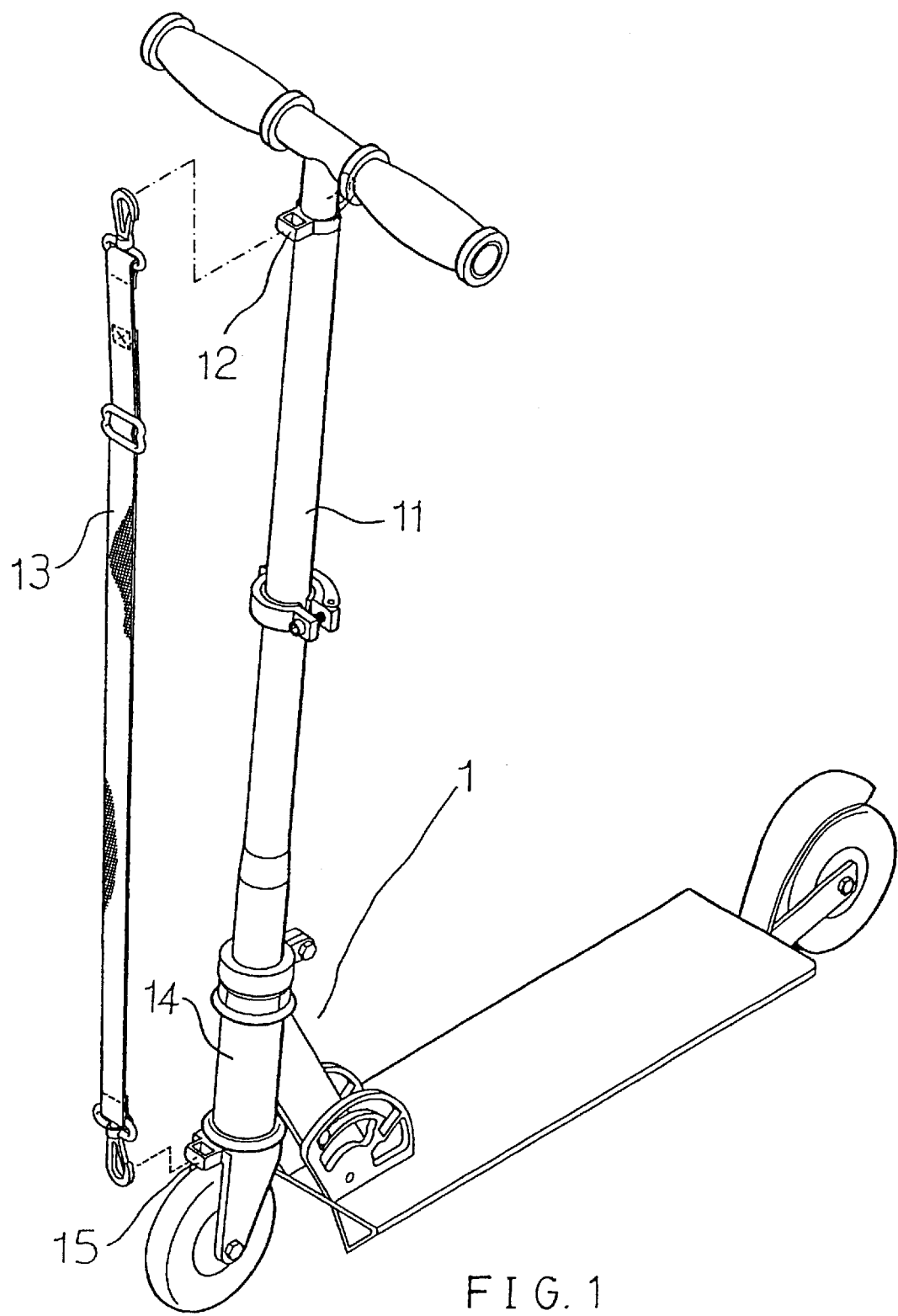
FIG. 1 shows a schematic view of a scooter carrying structure of the present invention.

As shown in FIGS. 1–4, a scooter 1 comprises a collapsible upright handlebar which is formed of an upper bar 11 and a lower bar 14 and is provided at both upper end and the lower end with a retaining ring 12, 15 for retaining a shoulder strap 13. The shoulder strap 13 is provided at both ends with a retaining hook, which is engaged with the retaining ring 12, 15.

Figure 2:
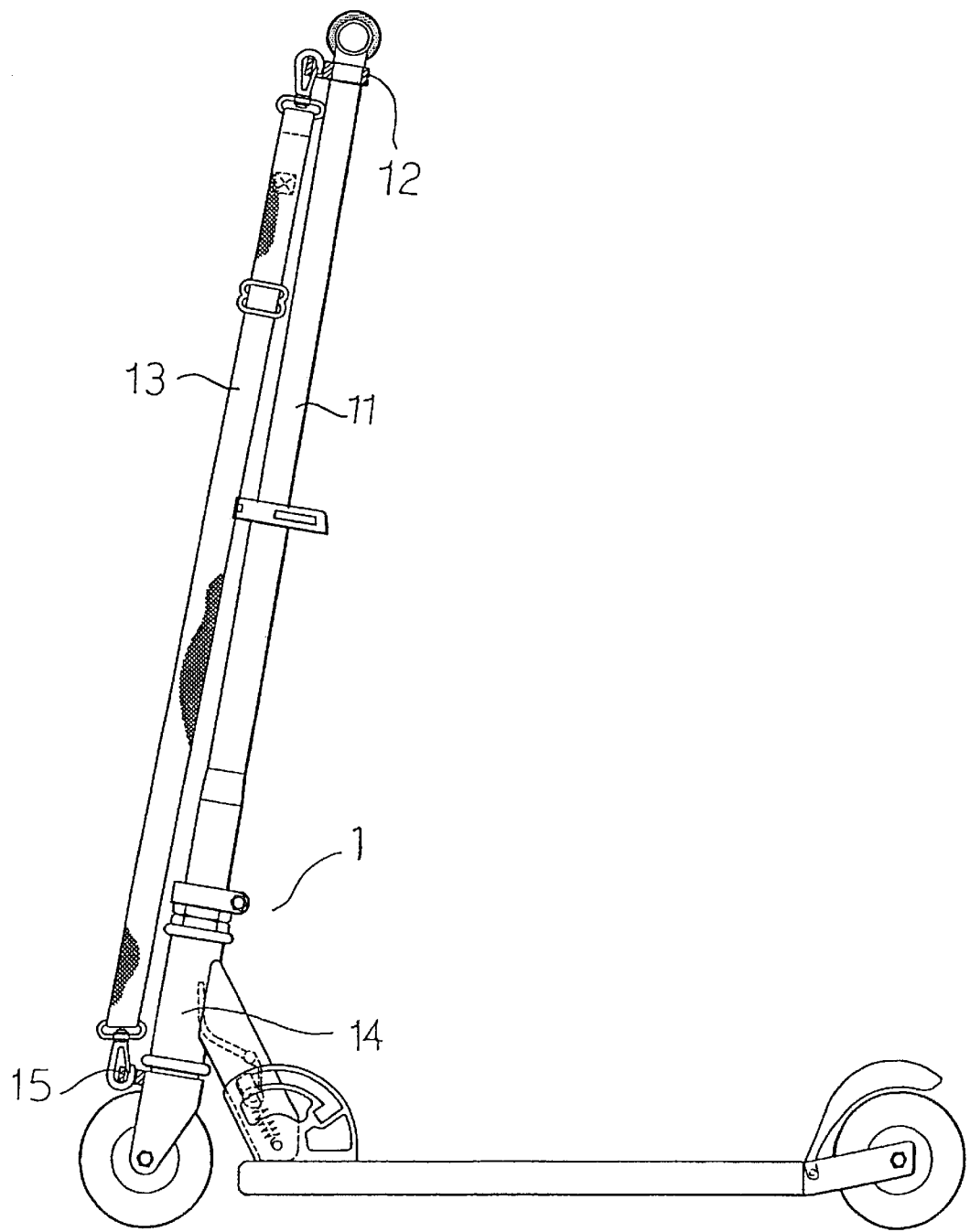
FIG. 2 shows another schematic view of the present invention.

As shown in FIG.2, the shoulder strap 13 is retained by the handlebar of the scooter 1 without hindering the riding of the scooter by a youngster.

Figure 3:
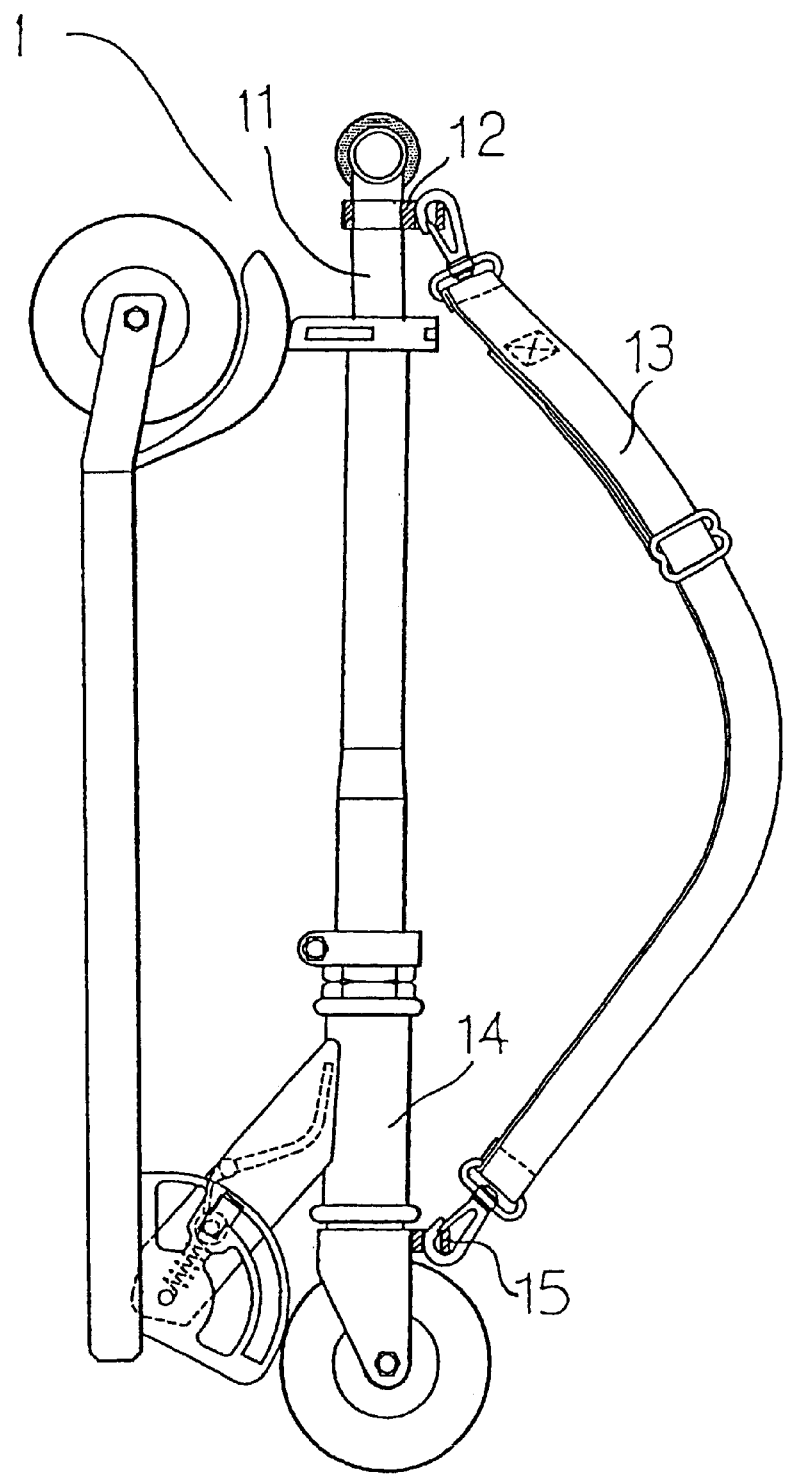
FIG. 3 shows a schematic view of the present invention along with the collapsed handlebar of a scooter.
Figure 4:
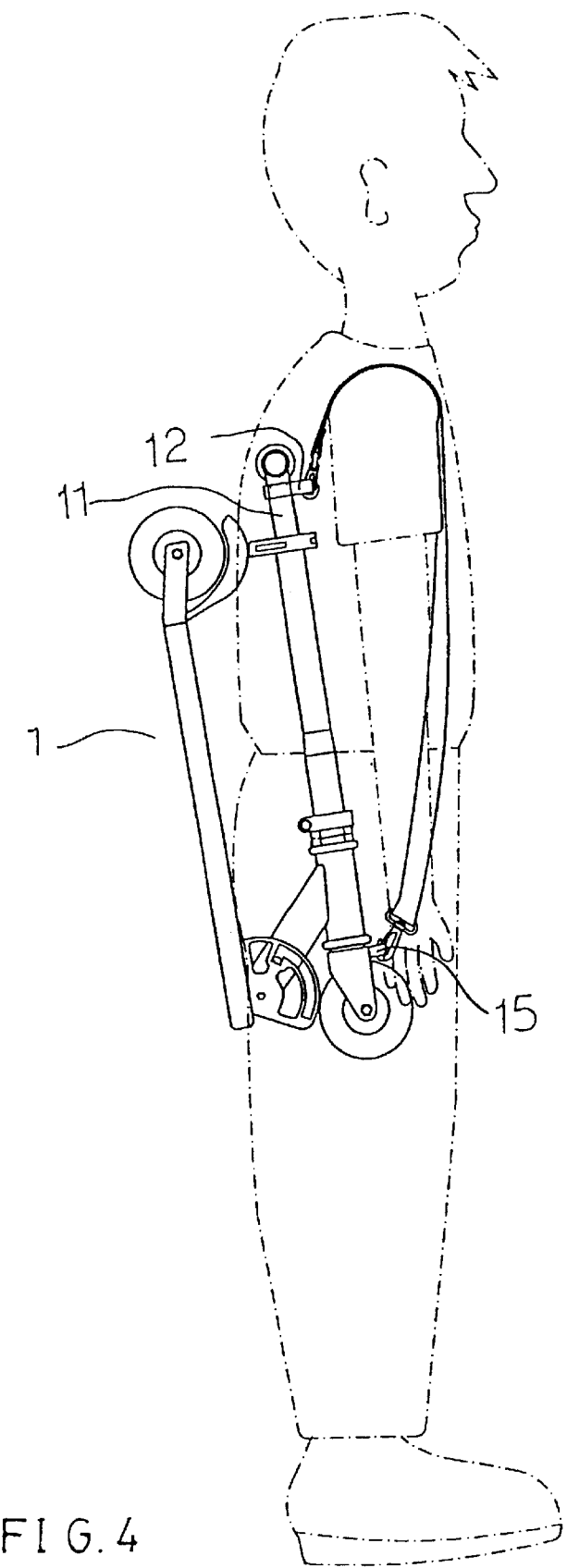
FIG. 4 shows a schematic view of the present invention at work.

As illustrated in FIGS. 3 and 4, the upright handlebar of the scooter 1 is collapsed to facilitate the shoulder strap 13 to be worn over the shoulder of a person for carrying the scooter 1.

Figure 5:
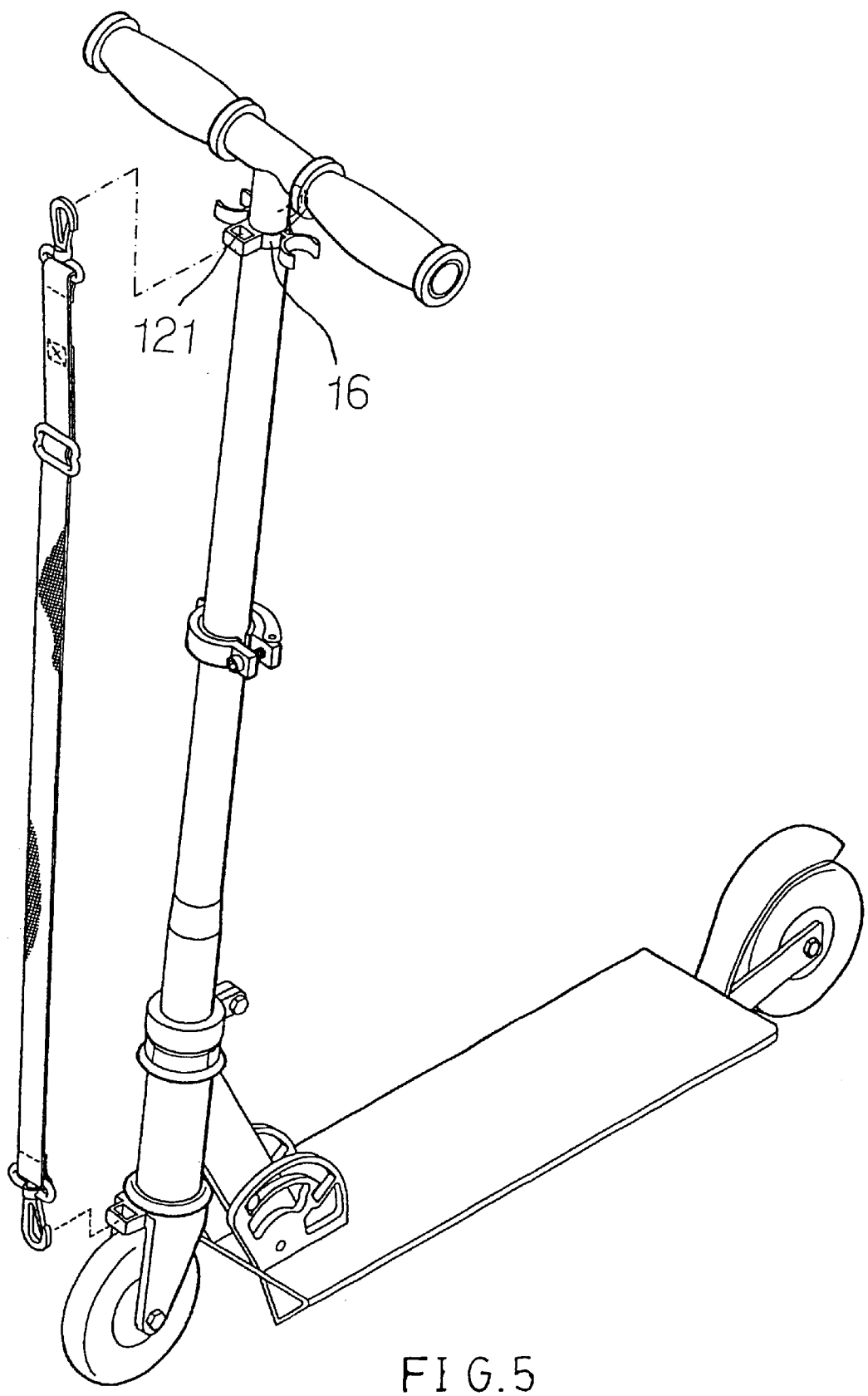
FIGS. 5–7 are schematic views of another preferred embodiment of the present invention.
Figure 6:
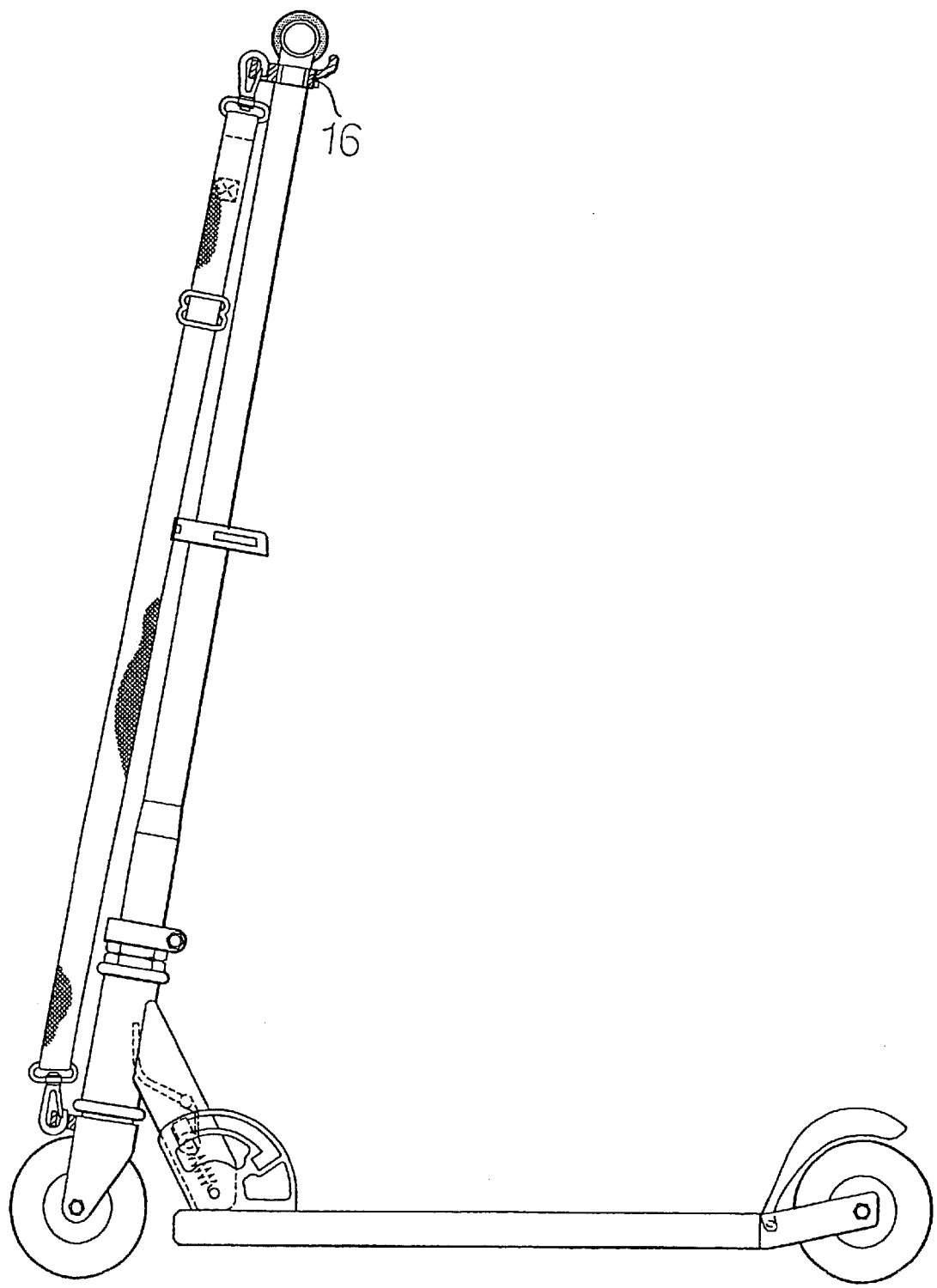
Figure 7:
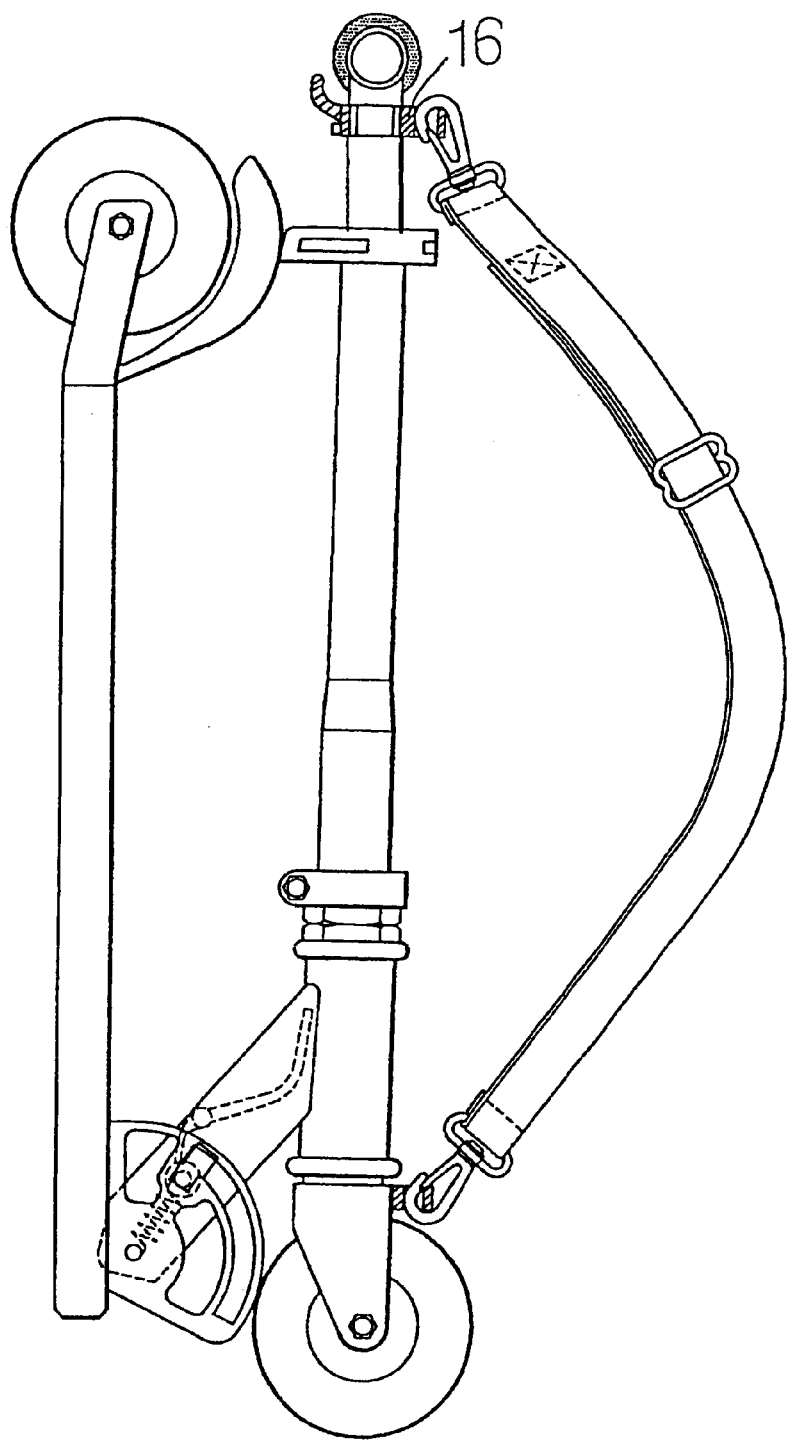

As shown in FIGS. 5–7, an upper retaining ring 121 of another preferred embodiment of the present invention is mounted on a locating seat 16 of the upper bar 11 of the handlebar of the scooter 1.

What is claimed is:

1. A combination of a scooter and a scooter carrier comprising an upper retaining ring fastened with the upper end of a collapsible upright handlebar of the scooter, a lower retaining ring fastened with the lower end of the collapsible upright handlebar of the scooter, and a shoulder strap provided at both ends with a retaining hook whereby said shoulder strap is retained by the collapsible upright handlebar of the scooter such that said retaining hooks of said shoulder strap are engaged with said upper retaining ring and said lower retaining ring of the collapsible upright handlebar of the scooter.

2. The scooter carrier as defined in claim 1, wherein said upper retaining ring is mounted on a locating seat of the upright handlebar of the scooter.

* * * * *